United States Patent
Huang et al.

(10) Patent No.: US 9,657,649 B2
(45) Date of Patent: May 23, 2017

(54) METHOD AND APPARATUS FOR DETECTING PERFORMANCE OF AN APU FUEL ASSEMBLY

(71) Applicant: Air China Limited, Beijing (CN)

(72) Inventors: Lei Huang, Beijing (CN); Zhuping Gu, Beijing (CN); Fengliang Zheng, Beijing (CN); Hongtao Ma, Beijing (CN); Jiaju Wu, Beijing (CN); Rong Wang, Beijing (CN); Lei Chen, Beijing (CN)

(73) Assignee: Air China Limited, Beijing (CN)

( * ) Notice: Subject to any disclaimer, the term of this patent is extended or adjusted under 35 U.S.C. 154(b) by 336 days.

(21) Appl. No.: 14/338,560

(22) Filed: Jul. 23, 2014

(65) Prior Publication Data

US 2016/0230676 A1    Aug. 11, 2016

(30) Foreign Application Priority Data

Jul. 24, 2013    (CN) .......................... 2013 1 0313848

(51) Int. Cl.
*G01M 15/14*    (2006.01)
*F02C 9/26*    (2006.01)
(Continued)

(52) U.S. Cl.
CPC .................. *F02C 9/26* (2013.01); *F02C 9/00* (2013.01); *G01M 15/14* (2013.01);
(Continued)

(58) Field of Classification Search
CPC ............. G05B 23/0235; F05D 2220/50; F05D 2260/80; F02C 9/00; F02C 9/26; G01M 15/14
(Continued)

(56) References Cited

U.S. PATENT DOCUMENTS 5,408,821 A  *  4/1995  Romero .................. B64D 41/00
                                                    60/39.15
7,331,169 B2 *  2/2008  Riley ........................ F02C 7/26
                                                    60/39.281
(Continued)

FOREIGN PATENT DOCUMENTS

EP    2543852 A2    1/2013
EP    2544064 A2    1/2013
EP    2543852 A3    8/2013

OTHER PUBLICATIONS

Gorinevsky, D. et al. "Model-Based Diagnostics for an Aircraft Auxiliary Power Unit", Proceedings of the 2002 IEEE International Conference on Control Applications, pp. 215-220, Sep. 18, 2002.

*Primary Examiner* — Freddie Kirkland, III
(74) *Attorney, Agent, or Firm* — Brundidge & Stanger, P.C.

(57)    ABSTRACT

The present invention relates to a method for detecting performance of an APU fuel assembly, comprising: obtaining APU messages at multiple time points within a time period; obtaining running parameters of the APU fuel assembly according to the APU messages, the running parameters at least comprising starting time STA; calculating average value AVG and deviation index δ of the starting time STA within said time period; determining whether performance of the APU fuel assembly is in the stable phase, decline phase, or failure phase according to the deviation index δ.

12 Claims, 7 Drawing Sheets

(51) Int. Cl.
*G05B 23/02* (2006.01)
*F02C 9/00* (2006.01)

(52) U.S. Cl.
CPC ...... *G05B 23/0235* (2013.01); *F05D 2220/50* (2013.01); *F05D 2260/80* (2013.01); *Y02T 50/671* (2013.01)

(58) Field of Classification Search
USPC ...................................................... 73/112.01
See application file for complete search history.

(56) References Cited

U.S. PATENT DOCUMENTS

| | | | |
|---|---|---|---|
| 7,369,932 B2 * | 5/2008 | Kim | F01D 21/00 477/30 |
| 7,805,947 B2 * | 10/2010 | Moulebhar | F01D 21/003 60/39.163 |
| 8,467,949 B2 * | 6/2013 | Kim | F02C 7/26 701/100 |
| 8,798,848 B2 * | 8/2014 | Gu | G06F 17/00 701/29.4 |
| 8,862,364 B2 * | 10/2014 | Kim | F02C 7/26 340/4.32 |
| 2003/0149550 A1 | 8/2003 | Famili et al. | |
| 2006/0195248 A1 * | 8/2006 | Kim | F01D 21/14 701/100 |
| 2007/0260390 A1 * | 11/2007 | Kim | F01D 21/00 701/100 |
| 2009/0048730 A1 * | 2/2009 | Akkaram | G07C 5/006 701/31.4 |
| 2013/0013222 A1 * | 1/2013 | Gu | F02C 9/00 702/33 |
| 2013/0179028 A1 * | 7/2013 | Gu | G06F 17/00 701/29.4 |
| 2013/0227959 A1 * | 9/2013 | Ainslie | F02C 7/26 60/778 |
| 2016/0230737 A1 * | 8/2016 | Gu | G05B 23/0235 |

* cited by examiner

APU MES/IDLE REPORT <13>

| | A/C ID | DATE UTC | FROM | TO | FLT | | |
| --- | --- | --- | --- | --- | --- | --- | --- |
| | Aircraft No. | UTC Date | Take off | landing | Flight No. | | |
| CC | BXXXX | yyyy-dd-mm xx:xx:xx | - | - | - | | |
| | PH | CNT | CODE | BLEEDSTATUS | | APU | |
| | Leg | Count | Trigger Code | Bleed Valve Status | | APU Bleed Valve | |
| C1 | 11 | 76401 | 4000 | 16 0000 1 00000 19 | | 1 | |
| | TAT | ALT | CAS | MN | GW | CG | DMU |
| | Total Temperature | Elevation | Calculate Air Speed | Mach Speed | Total Weight | Center of Gravity | Version |
| CE | 23.3 | 150 | - | - | 65600 | 29.2 | I71CA2 |
| | ASN | AHRS | ACYC | PHAD | | | |
| | APU Serial No. | APU hour | APU Cycle | APU Performance Adjustment | | | |
| E1 | 2056 | 18477 | 16894 | 4000 | | | |
| | ESN | ACW1 | ACW2 | NA | EGTA | IGV | |
| | Engine Serial No. | Control Word 1 | Control Word 2 | Rotate Speed | Exhaust Gas Temperature | IGV Location | |
| N1 | 011909 | 00000 | 0A000 | 99.7 | 588 | -5 | |
| N2 | 011473 | 00000 | 0A000 | 99.8 | 580 | -5 | |
| N3 | 000000 | 00000 | 04000 | 99.8 | 388 | 82 | |
| | P2A | LCIT | WB | PT | LCDT | OTA | GLA |
| | Inlet Pressure | Load Compressor Inlet Temperature | Bleed Air Flow | Bleed Air Pressure | Load Compressor Outlet Temperature | Lubricant Temperature | APU Generator Loading |
| S1 | .956 | 33 | .41 | 3.99 | XXXX | 110 | 38 |
| S2 | .952 | 32 | .41 | 3.99 | XXXX | 110 | 27 |
| S3 | .96 | 32 | 0 | 1.17 | XXXX | 107 | 0 |
| | STA | EGIP | NPA | OTA | ICIT | | |
| | PREVIOUS APU START (APU Starting Parameters) | | | | | | |
| | Starting Time | EGT Peak Value | Peak Value EGT Rotational Speed | Lubricant Temperature | Load Compressor Inlet Temperature | | |
| V1 | 49 | 808 | 35 | 110 | 32 | | |

FIG. 3

METHOD AND APPARATUS FOR DETECTING PERFORMANCE OF AN APU FUEL ASSEMBLY

TECHNICAL FIELD

The present invention relates to a method and an apparatus for detecting performance of an aircraft component, in particular to a method and an apparatus for detecting performance of an APU fuel assembly.

BACKGROUND ART

Airborne Auxiliary Power Unit, abbreviated as APU, is a small turbine engine mounted on the tail of an aircraft. Its main function is to supply power and gas sources, with a few APUs capable of providing additive thrust to the aircraft. Specifically, before taking off from the ground, an aircraft may do not need to rely on ground power and gas source vehicles to start the aircraft as its main engine may be started via power supply from the APU. While on the ground, the APU also supplies power and compressed air to ensure lighting and air-conditioning in the cabin and cockpit. During take-off of an aircraft, the APU can serve as a backup power source. After the aircraft is landed, lighting and air-conditioning of the aircraft are still powered by the APU. The functions of APU determine that its stability directly affects flight cost and quality of service of the aircraft.

APU fuel assembly is an important component of APU. Once the fuel assembly fails, it will directly cause the APU unable to start, and thus cause grounding of the aircraft. Currently, there is not any effective way to maintain the APU fuel assembly except for breakdown maintenance, which inevitably causes aircraft delay and increases of maintenance costs.

SUMMARY

For the above technical problem in prior art, there is provided, according to one aspect of the present invention, a method for detecting an APU fuel assembly of an aircraft, comprising: obtaining APU messages at multiple time points within a time period; obtaining running parameters of the APU fuel assembly according to the APU messages, the running parameters at least comprising starting time STA; calculating average value AVG and deviation index $\delta$ of the starting time STA within said time period; and determining whether performance of the APU fuel assembly is in the stable phase, decline phase or failure phase according to the deviation index $\delta$.

For the method as described above, wherein the step of determining whether performance of the APU fuel assembly is in the stable phase, decline phase, or failure phase comprises: in response to that the deviation index $\delta$ is smaller than the decline threshold value, determining that performance of the APU fuel assembly is in the stable phase; in response to that the deviation index $\delta$ is larger than the decline threshold value and smaller than the failure threshold value, determining that performance of the APU fuel assembly is in the decline phase; and in response to that the deviation index $\delta$ is larger than the failure threshold value, determining that performance of the APU fuel assembly is in the failure phase.

The method as described above further comprises: determining the deviation index when the APU fuel assembly is in the stable phase; wherein, the decline threshold value is about 2 times of the deviation index in the stable phase, and the failure threshold value is about 3-4 times of the stable deviation index.

For the method as described above, wherein the time period is about 2-4 days.

For the method as described above, wherein about 5-10 APU messages are obtained within the time period.

The method as described above further comprises: determining starting time $STA_{next}$ obtained according to a next APU-related message; in response to that $STA_{next}$ is larger than AVG+n$\delta$ or smaller than AVG−n$\delta$, determining whether $STA_{next+1}$ obtained according to a next APU-related message is larger than AVG+n$\delta$ or smaller than AVG−n$\delta$; and in response to that the number of times for starting time STA obtained according to APU-related message continuously larger than AVG+n$\delta$ or continuously smaller than AVG−n$\delta$ exceeds the preset warning number Z, sending out warnings; wherein, n is 2-5; Z is 3-5.

For the method as described above, in response to that starting time STA obtained according to APU-related message is smaller than AVG+n$\delta$ and larger than AVG−n$\delta$, recalculating average value AVG and deviation index $\delta$ of the starting time STA.

For the method as described above, in response to that the number of times for starting time STA obtained according to APU-related message continuously larger than AVG+n$\delta$ or smaller than AVG−n$\delta$ exceeds the preset warning number Z, recalculating average value AVG and deviation index $\delta$ of the starting time STA.

For the method as described above, wherein the deviation index $\delta$ is standard deviation.

For the method as described above, wherein the n is 2 or 3, and Z is 3.

The method as described above further comprises: determining that the APU starter works in normal condition.

The method as described above further comprises: determining that other parameters of APU keep normal, the other parameters comprising but not limited to: APU exhaust gas temperature EGT, bleed air pressure PT, angle of inlet guide vane IGV and APU turbine efficiency NPA.

According to another aspect of the present invention, there is provided an apparatus for detecting performance of an APU fuel assembly of an aircraft, comprising: message acquisition unit, which obtains APU messages in a time period; message parsing unit, which parses out the required running data of APU fuel assembly; and performance detection unit, which determines whether performance of the APU fuel assembly is in the stable phase, decline phase, serious decline phase, or failure phase according to the running data of the fuel assembly.

According to still another aspect of the present invention, there is provided an apparatus for detecting performance of an APU fuel assembly of an aircraft, comprising a processor; and a storage connected to the processor, which stores computer readable codes; the computer readable codes run on the processor to execute the following steps: obtaining APU messages in one time period; parsing out running parameters of the APU fuel assembly according to the message, the running parameters comprising starting time STA; and determining whether performance of the APU fuel assembly is in the stable phase, decline phase, serious decline phase or failure phase.

DESCRIPTION OF DRAWINGS

Hereinafter, preferred embodiments of the present invention are further described, taken in conjunction with the accompanying drawings, wherein:

FIG. 3 is a chart showing a curve reflecting changes of performance of an APU fuel assembly according to one embodiment of the present invention;

MODE OF THE INVENTION

Figure 1:
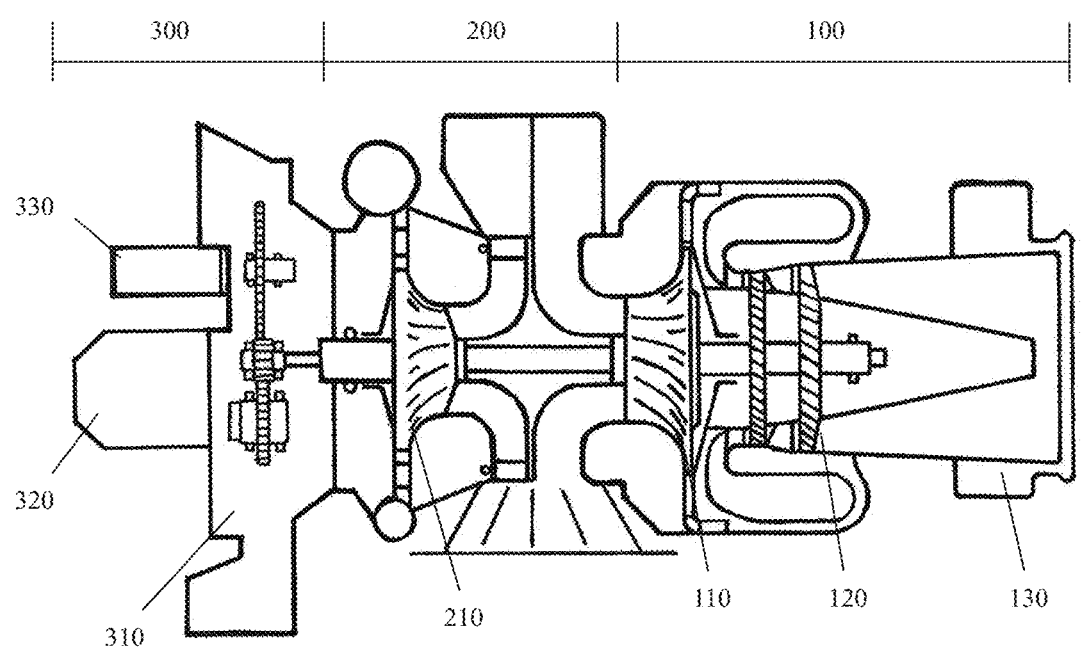
FIG. 1 is a schematic of the structure of an aircraft APU according to one embodiment of the present invention.

In order to give a clearer picture of the purposes, technical solutions and merits of embodiments of the present invention, technical solutions in the embodiments of the present invention will be fully described below, taken in conjunction with the accompanying drawings in the embodiments of the present invention. Apparently, the illustrated embodiments are only a part of the embodiments instead of all the embodiments of the present invention. Based on the embodiments in the present invention, all other embodiments a person will ordinary skill in the art achieved without any creative effort shall fall within the protection scope of the present invention.

In the following detailed description, reference may be made to each figure, which forms a part of the present application to illustrate specific embodiments of the present application. In the drawings, similar symbols in different figures identify substantially the same components. With the following detailed description of each specific embodiment of the present application, a person with related knowledge and ordinary skill in the art shall be able to performance the technical solution of the present application. It shall be appreciated that other embodiments may be utilized or changes may be made to the structure, logic or electrical property of embodiments of the present application.

FIG. 1 is a schematic illustrating the structure of an aircraft APU according to one embodiment of the present invention. As shown in the figure, the aircraft APU mainly comprises a power portion 100, a load portion 200, and an accessory portion 300. Wherein, the power portion 100 mainly comprises a power compressor 110, a turbine assembly 120, and an exhaust assembly 130 and so forth. The load portion 200 mainly comprises a load compressor 210; the accessory portion 300 mainly comprises an accessory gearbox 310, a starter 320, and an electric generator 330 and so forth. The power compressor 110 is utilized to supply gases at high pressure to be burnt in the combustion chamber. APU fuel assembly supplies fuel oil to the combustion chamber. Gas of high temperature and high pressure generated in the combustion chamber via the burning of fuel oil moves and rotates the turbine assembly 120. Input air flow from the air inlet diverges into two streams, with one entering the power compressor 110 and turbine assembly 120 mainly for rotating the APU and then flowing out via the exhaust assembly 130, while another stream entering the load compressor 210 to be pressurized by the load compressor to generate a compressed air exclusively for the use of an aircraft. At the entrance of the airflow, there is provided with a flow regulating valve (inlet guide vane) to regulate the opening degree of the valve (vane) in a real-time manner according to compressed air needed by an aircraft so as to control air flow into the load compressor.

When the APU is started, the starting system obtains power from the direct current system of the aircraft, supplies a direct current voltage of 28 V to the battery bus (BAT BUS), and the direct current voltage is further supplied to the starter via a contactor. The starter rotates and accelerates the APU rotor to a rotational speed such that the fuel and ignition system may work, and then ignites the fuel oil to further accelerate the APU. When the rotational speed reaches 35% to 60% of the normal rotational speed of APU, the starter is shut down while the APU continues to accelerate to a normal working rotational speed. For example, for APU of APS3200, when the rotational speed reaches 55% of the normal rotational speed of APU, the starter is shut off; while for APU of GTCP131-9A, when the rotational speed reaches 50% of normal rotational speed of APU, the starter is shut off.

Inventors of the present application found that performance of APU fuel assembly directly affects the starting time of APU. When performance of the APU fuel assembly deteriorates, oil supply to the combustion chamber is not enough, and it takes more time for the APU to accelerate to the normal working rotational speed. As service time of the fuel assembly increases, its efficiency will decrease gradually and oil supply efficiency will also decrease accordingly. When oil supply efficiency of the fuel assembly decreases to a certain degree, the APU can not accelerate to the normal working rotational speed, namely, failure of fuel assembly occurs.

Changes of performance of an APU fuel assembly follow certain rules: during the early and middle phases of the use of a fuel assembly, performance of the fuel assembly is relative stable, while during the later phase, its performance will deteriorate until breakdown. As the service time increases, the decline index continues to increase as performance of the APU fuel assembly declines gradually. When the decline index of the performance of the APU fuel assembly is relatively stable, its performance is in the stable phase; when the decline of performance of the APU fuel assembly accelerates, it performance enters the decline phase; when the decline index exceeds a certain threshold value, performance of the APU fuel assembly enters the failure phase during which malfunction might occur at any time. After the APU fuel assembly enters the failure phase, it will not only affect the use of APU and have adverse effect on quality of service and flight safety, but also cause unplanned maintenance and flight delay and grounding.

Figure 2:
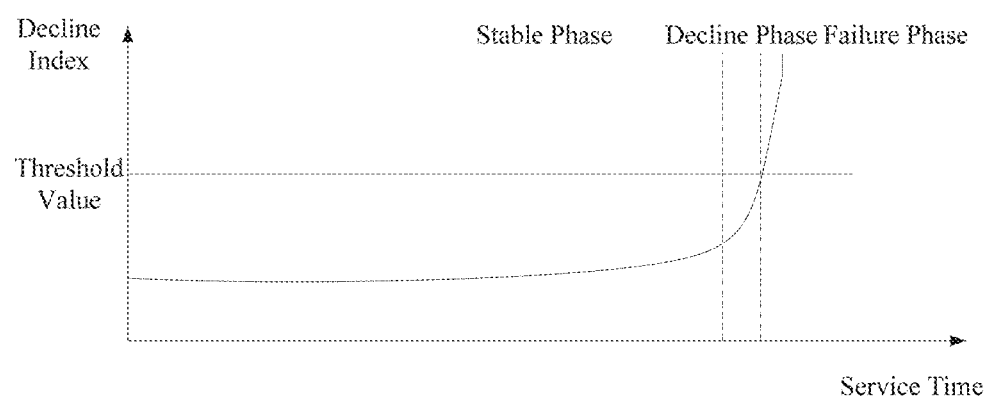
FIG. 2 is a schematic of the structure of an aircraft APU fuel assembly according to one embodiment of the present invention.

Performance of an aircraft APU fuel assembly FCU is mainly represented by starting time of APU. FIG. 2 is a statistical tendency diagram reflecting changes of data of the APU starting time caused by changes of performance of the APU fuel assembly. As shown in FIG. 2, when the fuel assembly is in the stable phase, starting time of the APU changes in a very small scope, however when the APU fuel assembly is in the decline phase, starting time of the APU leaps upwardly and disperses until the APU cannot be started due to malfunction. In addition, as can be seen from FIG. 2, the time from the entry into the decline phase to the occurrence of malfunction is very short. Therefore, the detection of decline phase of a fuel assembly becomes extremely important.

In prior art, there is no means for detecting whether performance of an APU fuel assembly is in a decline phase. However, some embodiments of the present invention may realize such detection. The detection of decline phase has the following merits: when an APU fuel assembly is in the decline phase, the probability of malfunction remains very low. If the aircraft is maintained at this time, flight safety and quality of service can be guaranteed. At that time, the airline company may arrange inspection and maintenance of the aircraft at an appropriate time so as to avoid unplanned maintenance and reduce flight delay. Meanwhile, excessive costs for maintenance at regular interval can be avoided.

Multiple methods can be utilized to obtain the running parameter STA (starting time). For example, the above data can be obtained from data stored in the black box FDR or Quick Access Recorder (QAR) of an aircraft.

The above data can also be obtained from the data system provided by the aircraft manufacturer, and real-time detection on the ground can be realized. For example, running data of an aircraft can be monitored in a real-time manner via both Aircraft Condition Monitoring System (ACMS) of Airbus and Aircraft Heath Monitor (AHM) system of Boeing. Besides, when certain trigger condition is met, a message containing a series of data information can be generated automatically.

According to one embodiment of the present invention, APU-related running data can be obtained via an aircraft data system (such as ACMS or AHM systems) and be embodied in the related generated message. Such message information can be transmitted to the ground via the Aircraft Communication Addressing and Reporting System (ACARS) and further be distributed to servers of different airline companies. According to one embodiment of the present invention, the APU message may also be transmitted via the communication apparatus or system of Aviation Telecommunication Network (ATN).

In fact, for existing flight data system, monitoring the performance of APU is an already-included item, and thus a corresponding APU message can be generated automatically and transmitted to the ground via ACARS or ATN. However, those data monitored are not utilized for detecting the decline phase of performance of APU. For example, the A13 message of Airbus (namely, APU MES/IDLE REPORT) or the APU message of Boeing is an example of such APU message. In the following embodiment, the A13 message of Airbus is illustrated as an example. APU message of Boeing is processed in a similar way.

FIG. 3 illustrates an example of A13 message of Airbus. As shown in the figure, the A13 message mainly contains the following 4 parts of information: the header, the APU history information, the running parameters for starting the aircraft engine and the APU starting parameters.

The header is composed of CC section and C1 section, mainly including information such as flight information, leg in which the message is generated, bleed valve status, total air temperature (i.e., external temperature). The APU history information is comprised of E1 section including APU serial number, service time and circulation and so forth. The running parameters for starting an aircraft engine is comprised of N1 to S3 sections; wherein N1 and S1 indicate the running status when the first aircraft engine is started; N2 and S2 indicate the running status when the second aircraft engine is started; N3 and S3 is the status after all engines are started and the APU is idling; wherein data relating to performance of the fuel assembly is starting time STA.

As can be seen from FIG. 3, starting time STA, the APU running parameter, is included in the existing A13 message. Therefore, detection of performance of the APU fuel assembly of the present invention can be realized by utilizing data obtained in this message.

Figure 4:
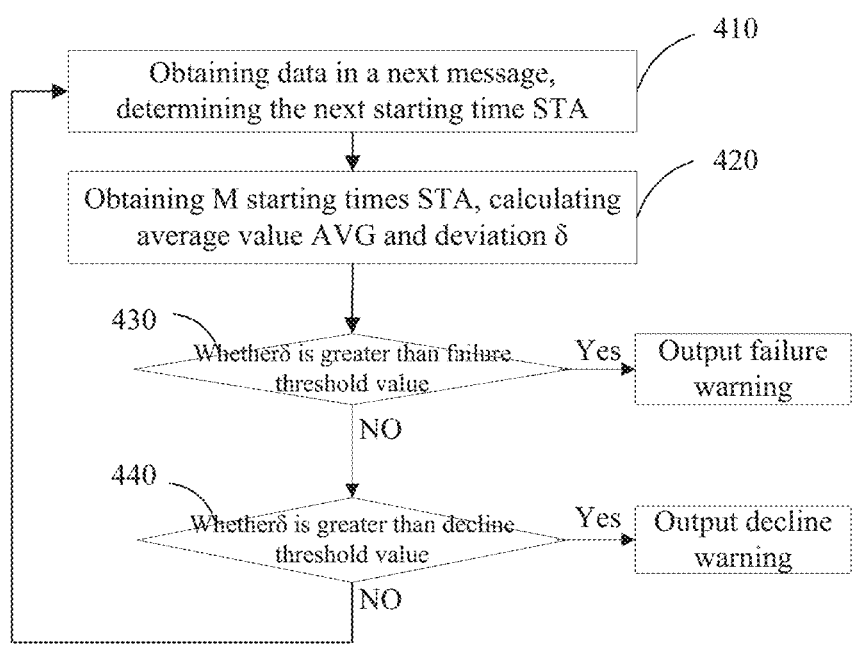
FIG. 4 is a statistic tendency diagram of data of starting time of an APU fuel assembly.

FIG. 4 is a flow chart illustrating a method for detecting performance of an APU fuel assembly according to one embodiment of the present invention. As shown in this figure, in method 400 for detecting performance of the APU fuel assembly, in step 410, starting time STA of an APU fuel assembly at a certain time point is obtained.

According to one embodiment of the present invention, information needed in step 410 can be obtained from an APU message such as the A13 message. For example, the A13 message of the running of an aircraft APU can be remotely obtained in a real-time manner from SITA (Societe Internationale de Telecommunications Aeronautiques) network control center and ADCC (Aviation Data Communication Corporation) network control center, and the obtained A13 message of APU running status can be decoded via a message decoder so as to obtain the required running information of the fuel assembly of the Aircraft APU.

In step 420, the previous M starting times STAs are obtained, and their average value AVG and standard deviation δ are calculated. According one embodiment of the present invention, the value of M may be 5-10.

In step 430, determine whether the standard deviation δ calculated in step 420 exceeds the failure threshold value. If yes, then output failure warning.

If the determination in step 430 is NO, then go to step 440, and determine whether the standard deviation δ calculated in step 420 exceeds the decline disperse threshold value. If yes, then output decline warning. Otherwise, return to step 410, and continue to obtain starting time STA of APU at a next time point.

According to one embodiment of the present invention, at first, fluctuation of the APU fuel assembly of a certain type in the stable phase is analyzed based on historical or experience data, and other threshold values are further determined based on the fluctuation in the stable phase. For example, according to one embodiment of the present invention, the decline threshold value is 2 times of the fluctuation in the stable phase, and the failure threshold value is 3 to 4 times of the fluctuation in the stable phase.

Such method for utilizing data keeping updated in a certain time period to analyze changes of trend is referred to as "moving window method". The size of the moving window, namely the number M of the points included in the calculation, depends on a number of factors, such as time interval between different measurements and control strategy and so forth. The smaller the moving window is, the easier the volatility of data will be affected by normal fluctuation, and thus various misinformation will occur, which will affect the technical effect of the present invention. If the moving window is overlarge, although the changes of trends will be reflected more accurately, the timeliness of the present invention will be reduced and warning information cannot be delivered in a timely manner. Therefore, the size of the moving window plays an important role in the present invention. According to one embodiment of the present invention, the value of M is around 5 on the condition that 2 to 3 points are measured in each day. According to another embodiment of the present invention, the value of M is around 10 on the condition that the number of points measured in each day is less than or equals to 2.

According to one embodiment of the present invention, in order to reduce false alarm and improve accuracy, the performance of an APU fuel assembly is determined to be in the decline phase only if two consecutive decline warnings occurred; while performance of the APU fuel assembly is determined to be in the failure phase only when more than 2 consecutive failure warnings occurred.

Figure 5:
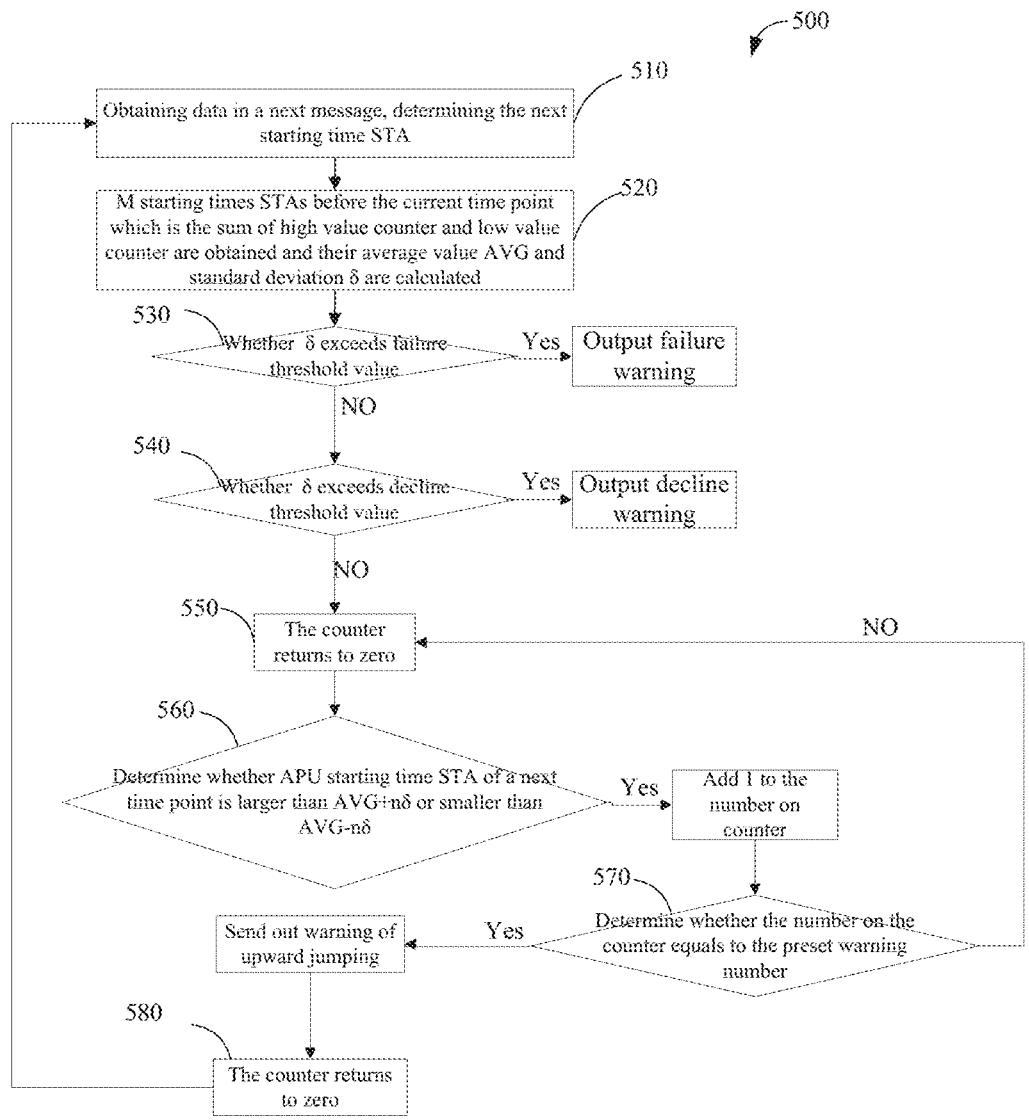
FIG. 5 is an example of A13 message of Airbus.

FIG. 5 is a flow chart illustrating a method for detecting performance of an APU fuel assembly according to another embodiment of the present invention. As shown in this figure, in the method 500 for detecting performance of the APU fuel assembly, similar to the embodiment illustrated in FIG. 4, in step 510, starting time STA of an APU fuel assembly of an aircraft at a certain service time point is obtained.

In step 520, M starting times STAs before the current time point which is the sum of high value counter and low value counter are obtained and their average value AVG and standard deviation $\delta$ are calculated. The reason for calculating average value and standard deviation of a certain number of previous points is to set a range of fluctuation for the judgment of a next point, however it is necessary to eliminate values that might be noise. According to the following description, high value counter is utilized to count deviation points higher out of the preset range, and the low value counter is utiliezed to count deviation points lower out of the preset range. When the number of deviation points that consecutively occurred does not reach the warning number, those deviation points will not be included into the sample for calculation of average value and standard deviation. According to one embodiment of the present invention, the value of M may be 5-10.

In step 530, compare whether the standard deviation $\delta$ calculated in step 520 exceeds the failure threshold value. If yes, then output failure warning.

When the judgment in step 530 is NO, then go to step 540, compare whether the standard deviation $\delta$ calculated in step 520 exceeds the decline threshold value. If yes, then output decline warning.

When the judgment in step 540 is NO, then go to step 550, the counter returns to zero. This is because the counting of deviation points is interupted according to the previous judgment, and it is necessary to return the counter to zero so as to recount the number of consecutive deviation points. The counter of this type may be realized via various software and hardware means.

In step 560, determine whether APU starting time STA of a next time point is larger than AVG+n$\delta$ or smaller than AVG−n$\delta$. Wherein, the value of n depends on control strategy. When the value of n is relatively high, the control on breakpoint is relatively loose, which may reduce misinformation but have the risk of missing the failure; while when the value of n is relatively low, the control on breakpoint is relatively strict, which may prevent report failure but may have warnings with high frequency. Generally speaking, the value of n is between 2 to 5. According to one embodiment of the present invention, the value of n is 3.

The following description is about the STA value is higher than the preset range and only the high value counter is used. In case the STA value is lower than the preset range, the situation is similar. When the judgment in step 560 is YES, then add 1 to the high value counter. In step 570, determine whether the number on the counter equals to the preset warning number. When the determination is NO, return to step 550. When the determination is YES, it means that some consecutive APU starting times STA, the number of which reaches the preset warning number, exceed the preset normal range of fluctuation, then send out warning of upward jumping. Since a single jump might be resulted from various causes, it is required that the warning is output only if the number of jumps consecutively exceeds a certain amount so as to avoid misinformation. The value of preset warning number is related to the control strategy, its value is 3 to 5 in general.

When the judgement in step 560 is No, return to step 510. It means that the starting time STA is within the normal range and no warning is necessary. In step 580, the counter is returned to zero. This is because when the number of consecutive deviation points reaches the preset warning number, the occurrence of deviation point is not accidental and shall not be eliminated as noise. To return the counter to zero at this time, those deviation points will be retained when recycled to step 520 so as to be included into the reference sample. Then, return to step 510 after this step ends.

According to one embodiment of the present invention, information needed in step 510 may be obtained in a way similar to that in step 410.

Figure 6:
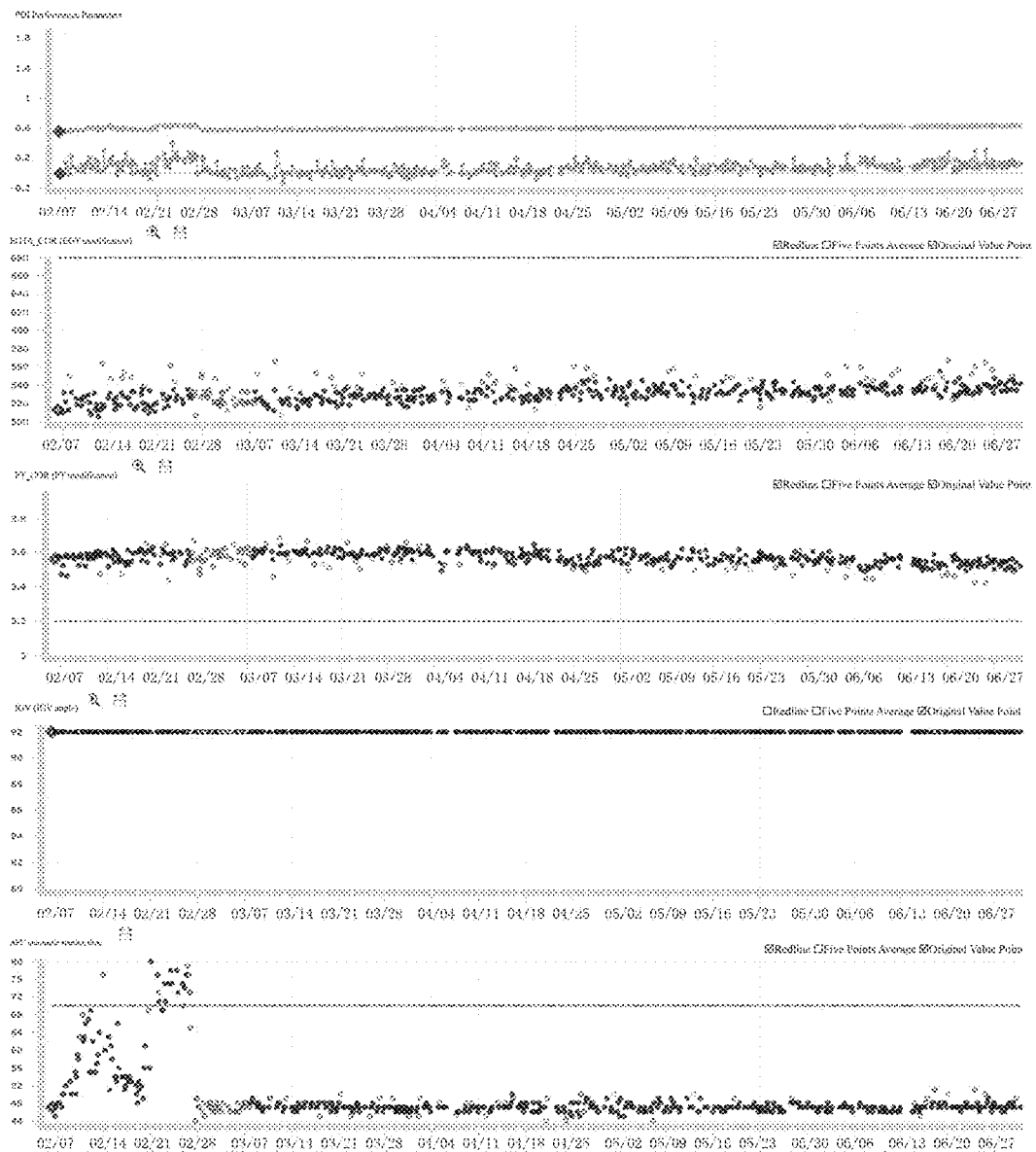
FIG. 6 is a flow chart illustrating a method for detecting performance of an APU fuel assembly according to one embodiment of the present invention.

FIG. 6 is an example of changes of performance of an APU fuel assembly according to one embodiment of the present invention. At the position marked by solid line in the figure, the APU fuel assembly is replaced. As shown in FIG. 6, before the replacement of the APU fuel assembly, the starting time STA increases, and standard deviation of STA also increases (namely, STA starts to disperse). If using the method descried above, one will find that the increase of STA deviation index such as standard deviation will soon trigger the warning that performance of the APU fuel assembly deteriorates into decline phase.

Meanwhile, it shall also be noted that other parameters of APU except for the starting time STA keep normal, the said other parameters comprise but are not limited to: APU exhaust gas temperature EGT, bleed air pressure PT, angle of inlet guide vane IGV and APU turbine efficiency. This is an important feature of the failure of APU fuel assembly.

It shall also be noted that manifestation of failure of the APU starter is also similar to the above. Therefore, it shall be distinguished from the failure of an APU starter: at first, although failure of APU starter may also causes increase of standard deviation of starting time STA, namely, STA dispersion, when the performance of APU fuel assembly deteriorates, the speed of deterioration of starting time STA is slow and standard deviation of STA increases and keeps at a certain level, and this phenomenon may last for over 100 hours per 50 number of start-ups; however, for the failure of starter, it may only last for at most 30 to 40 hours per 10 to 15 number of start-ups.

Besides, although when performance of the APU fuel assembly deteriorates, other parameters except for STA keep good, NPA and EGTP will also deteriorate gradually and approach their threshold value due to unsteady supply of oil. This feature may also facilitate the judgment of failure of an APU fuel assembly.

Figure 7:
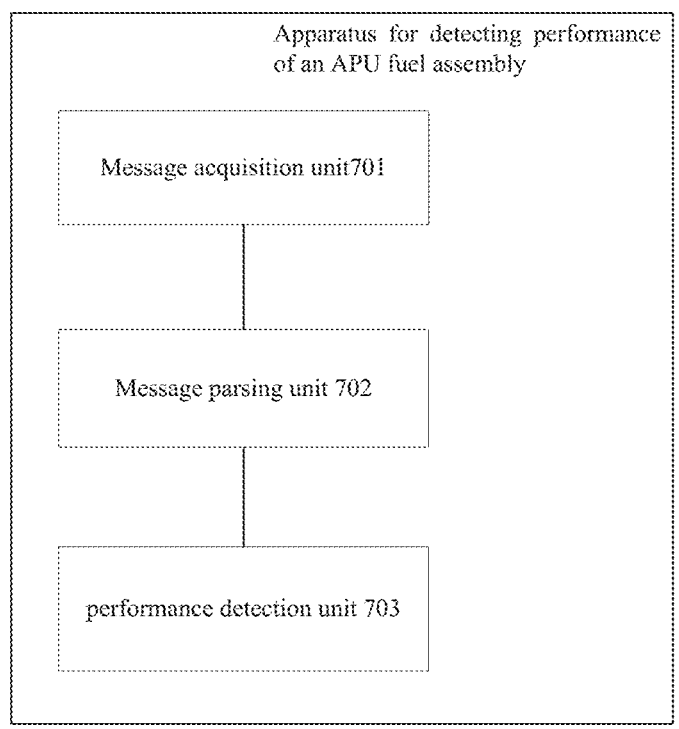
FIG. 7 is a flow chart illustrating a method for detecting performance of an APU fuel assembly according to another embodiment of the present invention.

FIG. 7 is a schematic of the structure of an apparatus for detecting performance of an APU fuel assembly according to one embodiment of the present invention. As shown in FIG. 7, the apparatus for detecting performance of an APU fuel assembly comprises: message acquisition unit 701, which obtains APU-related messages within a time period; message parsing unit 702, which parses out the required running data of the APU fuel assembly; and performance detection unit 703, which determines whether performance of the APU fuel assembly is in the stable phase, decline phase or failure phase according to the running data of the fuel assembly.

According to one embodiment of the present invention, an apparatus for detecting performance of an APU fuel assembly of an aircraft comprises: a processor; and a storage coupled to the processor, wherein the storage stores computer readable instructions; the computer readable instructions run on the processor so as to execute the following steps: obtaining APU-related messages in a time period; parsing out running parameters of the APU fuel assembly according to the messages, the running parameters comprise starting time STA; determining whether performance of the APU fuel assembly is in a stable phase, decline phase, or failure phase.

Deterioration of performance of fuel assembly is not too fast, general over 100 hours. According to previous troubleshooting rules and orders, it is difficult to spot breakdown of fuel assembly and capture any failure phenomenon. It often takes several times of replacements of other components to determine failure of fuel assembly FCU. With the present invention, maintenance staff may rapidly locate decline of performance of APU fuel assembly, which may avoid several times of replacements of other components, reduce overstock of aviation materials, and save enough time to prepare a standby component. It is very important for ensuring on-schedule operation of an aircraft. Meanwhile, it will help to control inventory more accurately, or even realize zero inventory.

The above embodiments are only described for illustrating the present invention, and do not mean to limit the present invention. A person with ordinary skill in relevant art may make various changes and variations without departing from the scope of the present invention. Therefore, all equivalent technical solutions shall also fall within the disclosure of the present invention.

We claim:

1. A method for detecting performance of an Airborne Auxiliary Power Unit (APU) fuel assembly of an aircraft, comprising:
   obtaining APU messages at multiple time points within a time period;
   obtaining running parameters of the APU fuel assembly according to the APU messages, the running parameters at least comprising starting times STAs within said time period;
   calculating average value AVG and deviation index $\delta$ of the starting times STAs within said time period; and
   determining whether performance of the APU fuel assembly is in a stable phase, a decline phase or a failure phase according to the deviation index $\delta$, the determining comprising:
      in response to that the deviation index $\delta$ is greater than a decline threshold value, determining that performance of the APU fuel assembly is in the stable phase;
      in response to that the deviation index $\delta$ is greater than the decline threshold value and is less than a failure threshold value, determining that performance of the APU fuel assembly is in the decline phase; and
      in response to that the deviation index $\delta$ is greater than the failure threshold value, determining that performance of the APU fuel assembly is in the failure phase; and
   determining a stable deviation index $\delta$ when the APU fuel assembly is in the stable phase;
   wherein, the decline threshold value is about 2 times of the stable deviation index in the stable phase, and the failure threshold value is about 3-4 times of the stable deviation index.

2. The method of claim 1, wherein the time period is between 2 and 4 days.

3. The method of claim 1, wherein about 5-10 APU messages are obtained within said time period.

4. The method of claim 1 further comprises:
   determining a starting time $STA_{next}$ obtained according to a next APU message;
   in response to that the starting time $STA_{next}$ is greater than $AVG+n\delta$ or less than $AVG-n\delta$, determining whether a subsequent starting time $STA_{next+1}$ obtained according to a follow-up next APU message is greater than $AVG+n\delta$ or less than $AVG-n\delta$; and
   in response to that a number of times for consecutive starting times obtained according to consecutive APU messages continuously greater than $AVG+n\delta$ or continuously less than $AVG-n\delta$ exceeds a preset warning number Z, outputting warnings;
   wherein, n is a value from 2 to 5; Z is a value from 3 to 5.

5. The method of claim 4, in response to that the starting time $STA_{next}$ obtained according to the next APU message is less than $AVG+n\delta$ and greater than $AVG-n\delta$, recalculating an average value AVG and a deviation index $\delta$ of starting times.

6. The method of claim 4, in response to that the number of times for consecutive starting times STA obtained according to the consecutive APU messages continuously larger than $AVG+n\delta$ or continuously smaller than $AVG-n\delta$ exceeds the preset warning number Z, recalculating an average value AVG and a deviation index $\delta$ of starting times.

7. The method of claim 4, wherein n is 2 or 3, and Z is 3.

8. The method of claim 1, wherein the deviation index $\delta$ is a standard deviation.

9. The method of claim 1, wherein an APU starter works in normal condition.

10. The method of claim 1, wherein other parameters of APU keep normal, the other parameters comprising one or more of: APU exhaust gas temperature EGT, bleed air pressure PT, angle of inlet guide vane IGV and APU turbine efficiency NPA.

11. An apparatus for detecting performance of an APU fuel assembly of an aircraft comprises a processor and a storage for storing computer readable instructions for instructing the processor implementing the following units:
   a message acquisition unit configured to obtain APU messages at multiple time points in a time period;
   a message parsing unit configured to parse out running parameters of the APU fuel assembly according to the APU messages, the running parameters at least comprising starting times within the time period; and
   a performance detection unit configured to determine whether performance of the APU fuel assembly is in a stable phase, a decline phase, or a failure phase according to a calculated average value and a calculated deviation index $\delta$ of the starting times of the APU within the time period by:
      in response to that the deviation index $\delta$ is greater than a decline threshold value, determining that performance of the APU fuel assembly is in the stable phase;
      in response to that the deviation index $\delta$ is greater than the decline threshold value and is less than a failure threshold value, determining that performance of the APU fuel assembly is in the decline phase; and
      in response to that the deviation index $\delta$ is greater than the failure threshold value, determining that performance of the APU fuel assembly is in the failure phase; and determining a stable deviation index when the APU fuel assembly is in the stable phase;

wherein, the decline threshold value is about 2 times of the stable deviation index in the stable phase, and the failure threshold value is about 3-4 times of the stable deviation index.

12. An apparatus for detecting performance of an APU fuel assembly of an aircraft comprises:
a processor; and
a storage coupled to the processor, which stores computer readable instructions;
the computer readable instructions run on the processor to execute the following steps:
obtaining APU messages at multiple time points within a time period;
parsing out running parameters of the APU fuel assembly according to the messages, the running parameters comprising starting times of the APU within the time period; and
determining whether performance of the APU fuel assembly is in a stable phase, a decline phase, or a failure phase according to a calculated average value and a calculated deviation index $\delta$ of the starting times within the time period, the determining comprising:
in response to that the calculated deviation index $\delta$ is greater than a decline threshold value, determining that performance of the APU fuel assembly is in the stable phase;
in response to that the calculated deviation index $\delta$ is greater than the decline threshold value and is less than a failure threshold value, determining that performance of the APU fuel assembly is in the decline phase; and
in response to that the calculated deviation index $\delta$ is greater than the failure threshold value, determining that performance of the APU fuel assembly is in the failure phase; and
determining a stable deviation index when the APU fuel assembly is in the stable phase;
wherein, the decline threshold value is about 2 times of the stable deviation index in the stable phase, and the failure threshold value is about 3-4 times of the stable deviation index.

* * * * *